(12) United States Patent
Poertzgen et al.

(10) Patent No.: US 10,166,960 B2
(45) Date of Patent: Jan. 1, 2019

(54) VEHICLE BRAKE SYSTEM FOR A MOTOR VEHICLE AND METHOD FOR CONTROLLING THE VEHICLE BRAKE SYSTEM WHEN THE PARKING BRAKE FUNCTION IS ACTIVATED

(75) Inventors: Gregor Poertzgen, Koblenz (DE); Heiner Versmold, Urbar (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 13/813,317

(22) PCT Filed: Jul. 5, 2011

(86) PCT No.: PCT/EP2011/003334
§ 371 (c)(1),
(2), (4) Date: Mar. 20, 2013

(87) PCT Pub. No.: WO2012/016616
PCT Pub. Date: Feb. 9, 2012

(65) Prior Publication Data
US 2013/0213746 A1    Aug. 22, 2013

(30) Foreign Application Priority Data

Aug. 3, 2010   (DE) .................. 10 2010 033 253

(51) Int. Cl.
*B60T 13/66* (2006.01)
*B60T 13/58* (2006.01)
(Continued)

(52) U.S. Cl.
CPC ............ *B60T 13/588* (2013.01); *B60T 1/065* (2013.01); *B60T 7/042* (2013.01); *B60T 7/107* (2013.01);
(Continued)

(58) Field of Classification Search
USPC .......................... 303/3, 15, 89; 188/156, 353
See application file for complete search history.

(56) References Cited

U.S. PATENT DOCUMENTS

| | | | |
|---|---|---|---|
| 6,394,235 B1 | 5/2002 | Poertzgen et al. | |
| 7,264,093 B2 | 9/2007 | Hashida et al. | |

(Continued)

FOREIGN PATENT DOCUMENTS

| | | |
|---|---|---|
| DE | 19620344 A1 | 8/1997 |
| DE | 19732168 C1 | 1/1999 |

(Continued)

*Primary Examiner* — Nicholas J Lane
(74) *Attorney, Agent, or Firm* — MacMillan, Sobanski & Todd, LLC (57) ABSTRACT

A vehicle brake system, comprising a hydraulically controllable disk brake device, which has an electromechanical actuating device for activating a parking brake function, wherein the vehicle brake system has a hydraulic circuit having a hydraulic pressure source and controllable hydraulic functional elements in order to hydraulically control the disk brake device according to a service brake action of a driver or according to an automatic activation of a driving assistance system, wherein the vehicle brake system further comprises a control device in order to control the electromechanical actuating device according to a parking brake action of the driver or according to an automatic activation of the parking brake function. In order to avoid overload states the control device is designed to control at least one of the hydraulic functional elements in such a way that, before the parking brake function is activated by controlling the electromechanical actuating device, a hydraulic volume currently acting on the disk brake device in order to produce a hydraulic pressure that causes a service brake action can be hydraulically isolated.

14 Claims, 4 Drawing Sheets

(51) Int. Cl.
  *B60T 7/04* (2006.01)
  *B60T 7/10* (2006.01)
  *B60T 7/12* (2006.01)
  *B60T 8/32* (2006.01)
  *B60T 8/48* (2006.01)
  *B60T 13/14* (2006.01)
  *B60T 13/74* (2006.01)
  *F16D 65/18* (2006.01)
  *B60T 1/06* (2006.01)
  *B60T 8/176* (2006.01)
  *B60T 13/68* (2006.01)
  *F16D 121/04* (2012.01)
  *F16D 121/24* (2012.01)
  *F16D 123/00* (2012.01)

(52) U.S. Cl.
  CPC .............. *B60T 7/122* (2013.01); *B60T 8/176* (2013.01); *B60T 8/32* (2013.01); *B60T 8/4872* (2013.01); *B60T 13/146* (2013.01); *B60T 13/662* (2013.01); *B60T 13/686* (2013.01); *B60T 13/741* (2013.01); *F16D 65/18* (2013.01); *B60T 2201/06* (2013.01); *F16D 2121/04* (2013.01); *F16D 2121/24* (2013.01); *F16D 2123/00* (2013.01)

(56) References Cited

U.S. PATENT DOCUMENTS

| | | |
|---|---|---|
| 7,744,166 B2 | 6/2010 | Leiter et al. |
| 8,061,491 B2 | 11/2011 | Tristano et al. |
| 8,322,495 B2 | 12/2012 | Leiter et al. |
| 8,408,660 B2 | 4/2013 | Oikawa et al. |
| 2005/0252732 A1 | 11/2005 | Hashida et al. |
| 2008/0053760 A1* | 3/2008 | Oikawa et al. ............... 188/72.4 |
| 2009/0133975 A1* | 5/2009 | Gilles .................... B60T 13/741 |
| | | 188/72.6 |

FOREIGN PATENT DOCUMENTS

| | | |
|---|---|---|
| DE | 102005042282 A1 | 3/2007 |
| DE | 102005051082 A1 | 5/2007 |
| DE | 102007041162 A1 | 3/2009 |
| DE | 102007053278 A1 | 5/2009 |
| WO | 2005073043 A1 | 8/2005 |

* cited by examiner

VEHICLE BRAKE SYSTEM FOR A MOTOR VEHICLE AND METHOD FOR CONTROLLING THE VEHICLE BRAKE SYSTEM WHEN THE PARKING BRAKE FUNCTION IS ACTIVATED

CROSS-REFERENCE TO RELATED APPLICATIONS

This application is a national stage of International Application No. PCT/EP2011/003334 filed Jul. 5, 2011, the disclosures of which are incorporated herein by reference in entirety, and which claimed priority to German Patent Application No. DE 10 2010 033 253.4 filed Aug. 3, 2010, the disclosures of which are incorporated herein by reference in their entirety.

BACKGROUND OF THE INVENTION

The present invention relates to a vehicle brake system comprising a hydraulically controllable disk brake device, which has an electromechanical actuating device for activating a parking brake function, wherein the vehicle brake system has a hydraulic circuit having a hydraulic pressure source and controllable functional elements in order to hydraulically control the disk brake device according to a service brake action of a driver or according to an automatic activation of a driving assistance system, wherein the vehicle brake system further comprises a control device in order to control the electromechanical actuating device according to a parking brake action of the driver or according to an automatic activation of the parking brake function. The invention further relates to a method for controlling a vehicle brake system of the previously described type.

A variety of vehicle brake systems are known from the background art. Specifically the document DE 10 2005 051 082 A1, and corresponding U.S. Pat. No. 8,322,495 B2, both of which are incorporated by reference herein in entirety, describes a vehicle brake system having a disk brake that is designed as a floating caliper disk brake. In this case, a friction lining arrangement comprising two opposing friction linings on either side of a brake disk is provided. The one brake lining is attached to a floating caliper, while the other brake lining may be hydraulically displaced relative to the floating caliper by means of an actuating piston. As a result of a hydraulic loading of an actuating piston the movable brake lining is displaced towards the brake disk. The brake lining fixed to the floating caliper is in an, as such, known manner pulled towards the brake disk from the other side by means of the floating caliper function, so that a braking force acts from both sides upon the brake disk.

In addition to this floating caliper function, which has been known for a long time, this background art moreover also provides an electromechanical actuating device. This is used to realize a parking brake function. Given corresponding control the disk brake, besides the hydraulic displacement, may in addition be actuated electromechanically. To avoid having to dimension the electromechanical components, in particular the electric motor, far too large and powerful, it may be provided that the activation of the parking brake is assisted hydraulically. In other words the brake is hydraulically preloaded, the hydraulic preloading pressure is maintained and the parking brake is then blocked by means of the electromechanical actuating device. In a correspondingly elaborate manner hydraulic assistance also has to be provided for releasing the parking brake function.

From the prior art WO 2005/073043 A1, and corresponding U.S. Pat. No. 7,744,166 B2, both of which are incorporated by reference herein in entirety, a corresponding disk brake device and a method of controlling this disk brake device are further known, whereby using various sensors and employing predetermined mathematical models in dependence upon the actual operating situation, such as for example a loaded state of the vehicle or an inclination of the road, it is possible also to generate braking forces that lie substantially above the braking forces that may be generated solely by the electromechanical actuating device.

It has however emerged that, given such a combination of hydraulic and electromechanical brake, because of the high collective load of hydraulically and electromechanically generated brake application forces upon activation of the parking brake function the electromechanical components of the electromechanical actuating device have to be designed with a corresponding load rating in order to avoid failure. Particularly during the subsequent release of the parking brake it is then namely necessary to overcome the brake application force, which is generated hydraulically and mechanically in order to activate the parking brake function and is, as it were, conserved during the braking state, by means of a correspondingly powerful mechanism or using hydraulic assistance.

BRIEF SUMMARY OF THE INVENTION

A feature of the present invention is to provide a disk brake device of the type described in the introduction, in which with simultaneous utilization of a service-braking-related applied hydraulic pressure the collective load upon activation of the parking brake function may be reduced and the releasing of the parking brake function may be effected in a less elaborate manner.

This feature is achieved by a disk brake of the type described in the introduction, in which it is provided that the control device is designed to control at least one of the hydraulic functional elements in such a way that, before the parking brake function is activated by controlling the electromechanical actuating device, a hydraulic volume currently acting on the disk brake device in order to produce a hydraulic pressure that causes a service brake action can be hydraulically isolated.

In other words, according to the invention it is provided that the hydraulic volume acting in any case upon the disk brake device as a result of an already activated service brake function is initially hydraulically locked in, i.e. isolated from the pressure supply, so that the hydraulic pressure prevailing in the disk brake device is maintained at the start of activation of the parking brake function. However, as soon as the electromechanical actuating device is triggered in order to activate the parking brake function, i.e. the disk brake device is applied electromechanically, the hydraulic volume increases as a result of displacement of the actuating piston of the disk brake device. The hydraulic pressure in the disk brake device accordingly decreases rapidly, so that the hydraulically built-up braking forces decrease during the electromechanical brake application upon activation of the parking brake function. Consequently, during the activation of the parking brake function starting from the hydraulic pressure applied as a result of an (automatic or driver-initiated) service braking operation substantially electromechanically generated brake application forces come into effect, so that in the course of the purely electromechanical release an overloading of the brake system or of individual components of the disk brake devices that results from the collective hydraulically and electromechanically generated brake application forces may be ruled out.

According to the invention it may be provided that the hydraulic circuit comprises a plurality of controllable valves in order selectively to supply hydraulic pressure to, or hydraulically isolate, individual disk brake devices of the vehicle brake system. Usually the valves are triggered in the course of a service braking operation in accordance with the default settings of a slip regulating system. In this connection it may be provided according to the invention that the valves are controllable by means of the control device in such a way that only the disk brake devices of the vehicle brake system that are configured with a mechanical actuating device can be hydraulically isolated. These are, as a rule, the disk brake devices at the rear wheels. However the invention also makes it possible for parking brake devices to be disposed even on the conventionally larger-sized disk brake devices of the front wheels and to be controlled in a suitable manner, without the parking brake device having to be in each case of a particularly stable or powerful design.

As already indicated above, according to the invention it is possible for the control device to be designed with a slip regulating function. In this case it may be provided that the hydraulic volume can be isolated by means of at least one valve associated with the slip regulating function. The valve may be for example a brake-circuit shut-off valve or an ABS inlet valve of a slip regulating system.

According to the invention it may further be provided that the control device prior to an activation of the parking brake function detects whether a hydraulic pressure is applied to the disk brake device as a result of a service brake action initiated by the driver or automatically. This is possible with a low technical outlay for example in that the control device detects the presence of a service brake action by the driver or of a braking operation that is initiated automatically by a driving assistance system (for example ACC or Hill-hold with hill ascent—and hill descent assistance) or a safety system (for example ESP) on the basis of available parameters, in particular on the basis of the current switching state of a brake light switch, the hydraulic pressure in a master cylinder, or the pedal travel of a brake pedal.

The invention further relates to a method of controlling a vehicle brake system for activating a parking brake function of the previously described type, comprising the following steps:
  detect an actual state of a disk brake device,
  isolate a hydraulic volume exerting a hydraulic pressure in the disk brake device, and
  activate the electromechanical actuating device to apply the parking brake function.

In this method it may be provided according to the invention that the actual state is detected on the basis of available parameters, in particular on the basis of the current switching state of a brake light switch, the hydraulic pressure in a master cylinder, or the pedal travel of a brake pedal.

Other advantages of this invention will become apparent to those skilled in the art from the following detailed description of the preferred embodiments, when read in light of the accompanying drawings.

DETAILED DESCRIPTION OF THE INVENTION

Figure 1:
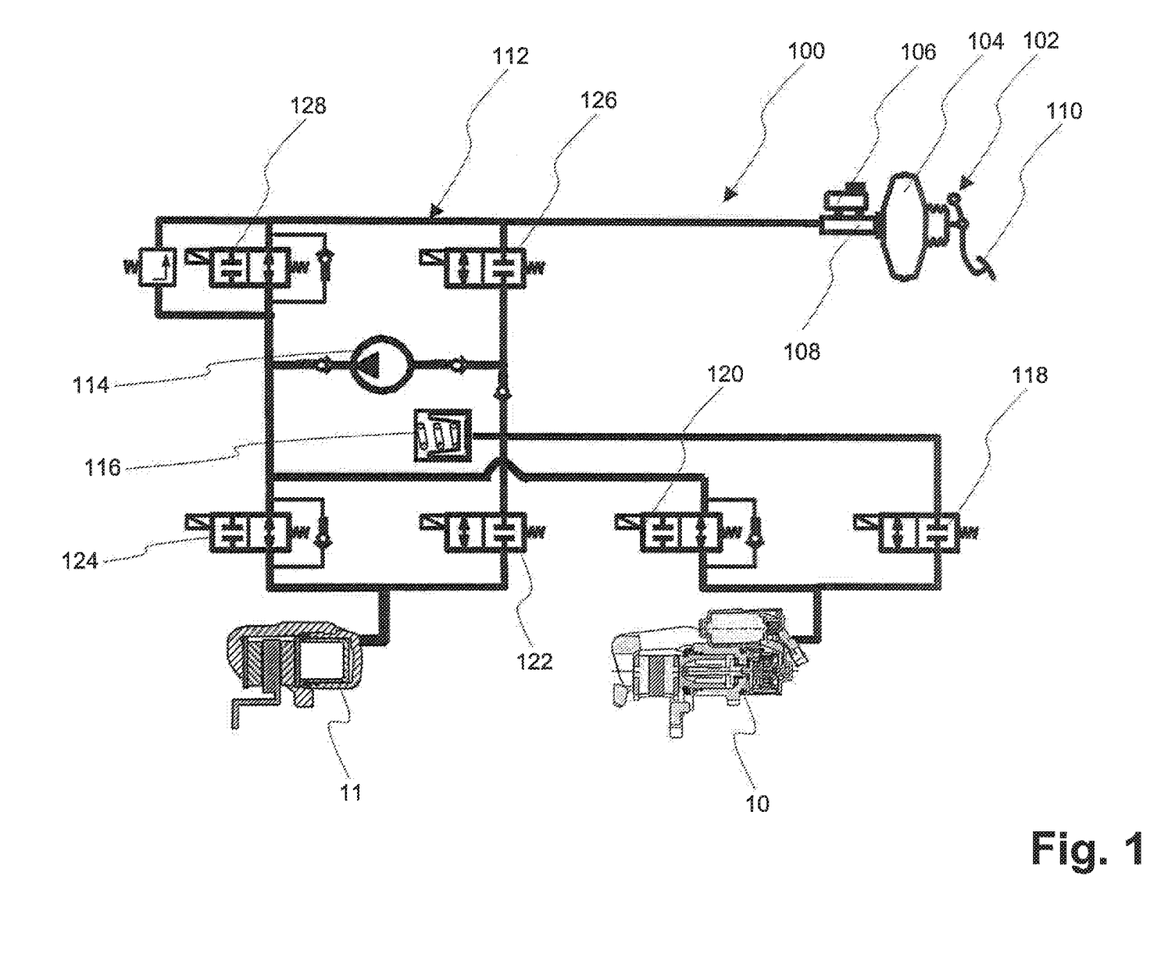
FIG. 1 is a block diagram of a vehicle brake system according to the invention, a disk brake device for a front wheel and a disk brake device for a rear wheel being shown diagrammatically.

In FIG. 1 a block diagram for a vehicle brake system 100 according to the invention is schematically shown. This system comprises a pressure source 102, which is configured with a brake booster 104, a reservoir 106, a master cylinder 108 and a brake pedal 110 actuable by the driver. The pressure source 102 is coupled hydraulically to a hydraulic brake circuit 112. This comprises a motor-controllable pump 114, as well as a pressure accumulator 116. Further evident are two disk brake devices, namely a disk brake device 10 for a rear wheel and a disk brake device 11 for a front wheel.

Associated with the disk brake devices 10, 11 there are in each case valves 118, 120, 122, 124, which are controllable by means of a non-illustrated control device. Additionally evident are inlet valves 126 and 128, which enable the hydraulic brake circuit 112 to be hydraulically uncoupled from the pressure source 102 actuable by the driver.

With regard to the service brake function the schematically illustrated vehicle brake system 100 operates in an, as such, known manner. The non-illustrated control device further offers a slip regulating function in order to be able to carry out anti-skid control operations (ABS), anti-spin control operations (ASR), vehicle dynamics control operations (ESP) as well as automatic braking operations, for example for adaptive cruise control (ACC).

For a clearer understanding the structure of the disk brake device 10 on the rear wheel is described in detail below.

Figure 2:
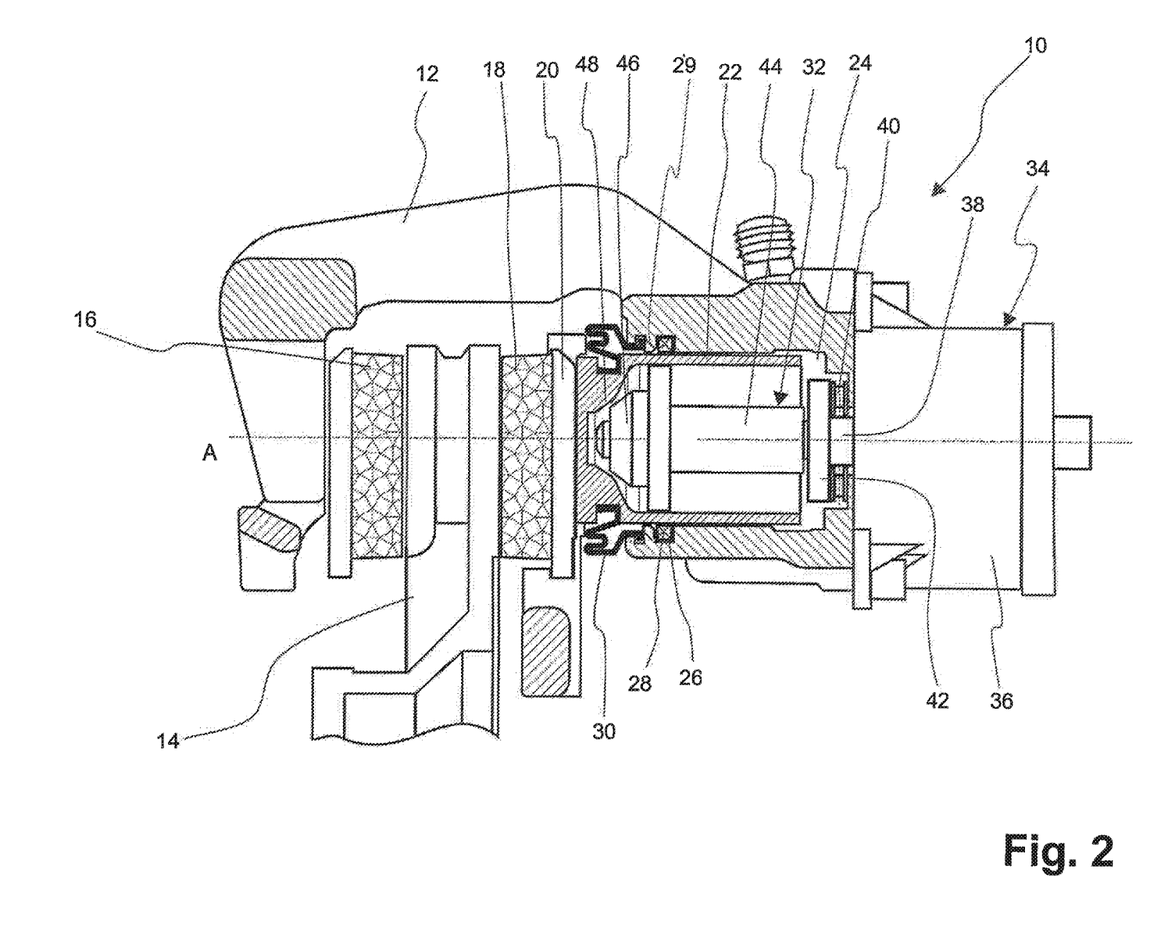
FIG. 2 is a part-sectional detail view of the disk brake device for the rear wheel according to FIG. 1 with corresponding parking brake device.

In FIG. 2 the disk brake device 10 according to the invention is represented in a part-sectional view. It comprises a caliper 12, which is float-mounted in a conventional manner by means of a non-illustrated brake anchor plate and spans a brake disk 14, which is coupled in a rotationally fixed manner to a vehicle wheel. Provided in the caliper 12 is a brake lining arrangement, which comprises a brake lining 16 lying adjacent to the caliper 12 as well as a brake lining 18 lying adjacent to an actuating piston 22. The two brake linings 16 and 18 face one another and in the released position shown in FIG. 2 are disposed with slight clearance on either side of the brake disk 14 so that no significant residual drag torques arise. The movable brake lining 18 is disposed via a brake lining carrier 20 on an actuating piston 22 for joint movement. The actuating piston 22 is mounted displaceably in a cylindrical hollow space 24 in the caliper 12. In the region of this hollow space 24 lying near the brake disk a circumferential receiving groove 26 is provided, in which an annular sealing element 28 is accommodated.

It is further evident that the actuating piston 22 at its, in FIG. 2 left, end facing the brake disk 14 is provided with an annular gaiter 30, which prevents dirt from being able to penetrate into the region between the actuating piston 22 and the peripheral wall defining the receiving hollow space 24 of the caliper 12.

In FIG. 2 it is further evident that the actuating piston 22 is of a hollow construction. Accommodated in it is a thrust piece 32 of an electromechanical actuating arrangement 34. The electromechanical actuating arrangement 34 comprises a drive assembly 36 comprising an electric motor and a gear arrangement. An output shaft 38 of this drive assembly 36 drives a drive spindle 42, which is supported via a thrust bearing 40 and the thread of which is accommodated in a thread receiver 44 of the thrust piece 32.

The thrust piece 32 in its, in FIG. 2 left, region facing the brake disk 14 has a conical portion 46, which may be brought into abutment with an inner surface 48 of the actuating piston 22 that is of a complementary conical configuration. In the release position shown in FIG. 2 there is a clearance between the two conical surfaces 46 and 48.

If the brake is hydraulically actuated by the driver via the brake pedal or automatically by a driving assistance system (for example ACC or Hill-hold with hill ascent—and/or hill descent assistance) or by a safety system (for example ESP), then in an, as such, known manner a hydraulic pressure is built up in the hollow space 24 so that the actuating piston 22 is displaced in FIG. 1 to the left along the longitudinal axis A. Consequently, with the floating caliper arrangement in an, as such, known manner the brake lining 18 is pressed onto the brake disk 14 and at the same time the brake lining 16 at the other side of the brake disk 14 is pulled against the brake disk 14 as a result of corresponding displacement of the caliper 12.

As a result of loading of the inner space 24 with pressurized hydraulic fluid the actuating piston 22 is displaced in FIG. 2 to the left along the longitudinal axis A, resulting in a braking effect. The radially outer sealing element 28 under the applied pressure and as a result of the movement of the actuating piston 22 deforms elastically into the region of a chamfer-shaped recess 29.

If then, for example as a result of releasing the brake pedal or deactivating the driving assistance—and/or safety system, the hydraulic pressure in the inner space 24 of the caliper 12 is reduced, the sealing element 28 is able to elastically expand and adopts its original shape in accordance with FIG. 2. This means that in the course of its elastic expansion it pulls the actuating piston 22 back out of the actuating position because of the mutual friction contact and hence moves the disk brake device into the initial state thereof. This corresponds to the, as such, known rollback function, which is achieved in conventional brakes by means of the outer seal 28 at the outer circumference of the actuating piston 22.

Figure 3:
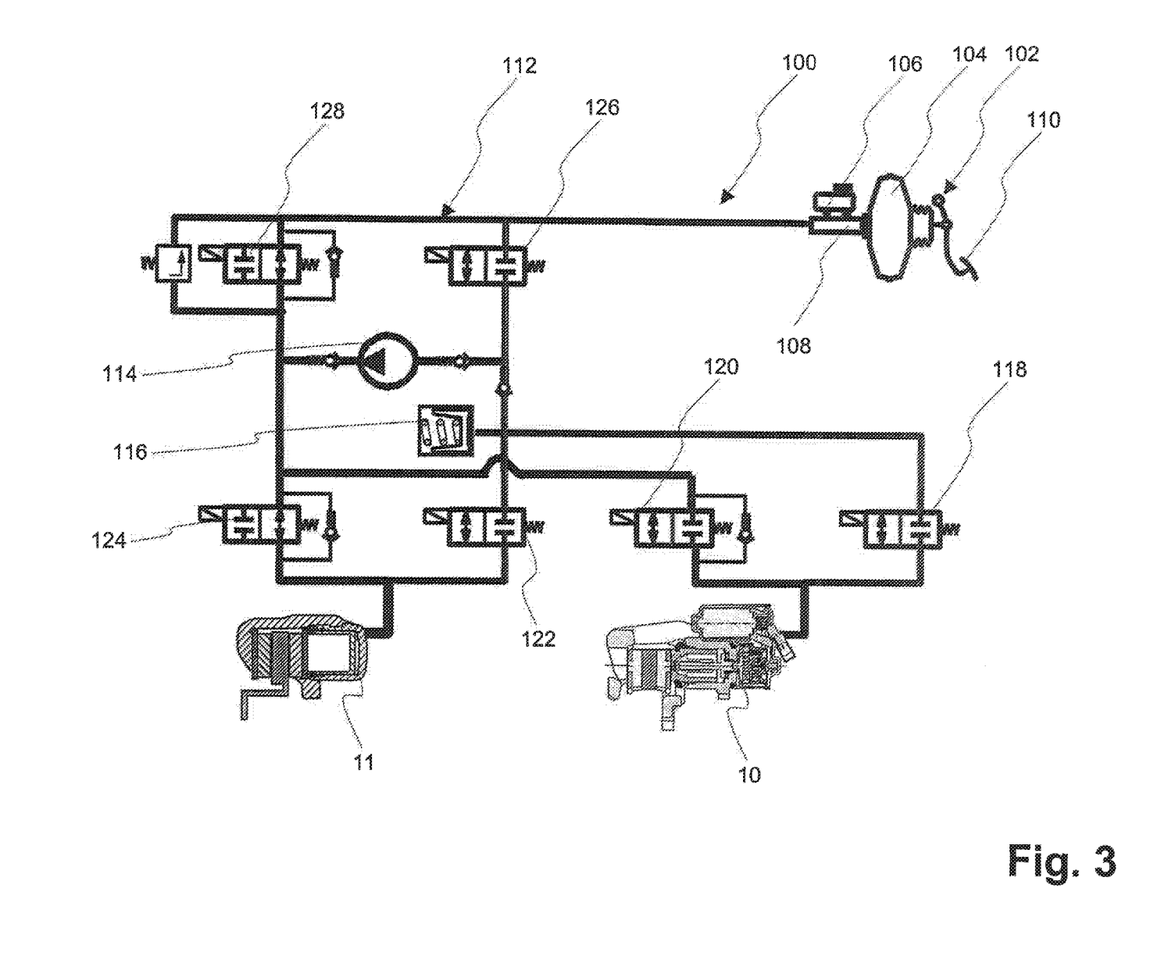
FIG. 3 is the schematic diagram according to FIG. 1 in the situation of a triggering to release the parking brake function.

With regard to an activation of the parking brake function a distinction is to be made between two situations: if there is no hydraulic pressure being applied in the interior 24 of the disk brake device 10 and preloading the actuating piston 22, then according to the invention in order to activate the parking brake function only the electromechanical actuating device 34 is triggered. If however a hydraulic pressure is being applied at the disk brake device 10 and preloading the actuating piston 22, for example because a driver prior to activating the parking brake function has pressed down the brake pedal or because an automatic braking operation has been carried out, then the hydraulic volume situated in the inner space 24 is isolated, as represented in FIG. 3, from the rest of the braking system 100 by closing the inlet valve 120 (ABS-Iso), said hydraulic volume being so to speak shut in or locked in. The pressure state prevailing because of the service braking operation is accordingly conserved in the inner space 24 at the start of activation of the parking brake function.

The electromechanical actuating device 34 is then triggered. Under the action of the electromechanical actuating device 24 the thrust piece 32 moves forward until the clearance is used up and the conical surface 46 is positioned against the corresponding conical surface 48 in the interior of the actuating piston 22. The result achieved is that the actuating piston 22 is supported axially via the thrust piece 32 and the thrust bearing 40 against the housing of the caliper 12. The thrust piece 32 then moves the actuating piston 22 further forward. In this case the volume of the inner space 24 increases. However, as a result of the increase in volume of the inner space 24 the hydraulic pressure in the inner space 24 decreases. This is because the hydraulic volume—as previously described—has been shut in. Thus, unlike conventional solutions where the hydraulic pressure is kept at a constant level also upon displacement of the actuating piston 22 in the inner space 24 during activation of the parking brake function, leading to a superimposing of hydraulic and electromechanical preloading, the present invention provides that such a superimposing of hydraulic and electromechanical preloading is prevented. The result is therefore substantially no collective load during the activation of the parking brake function, this instead being effected solely on the basis of the electromechanical preloading.

The parking brake state is maintained because of the position of the thrust piece 32 and the self-locking (for example by means of a self-locking gear between spindle 42 and receiver 44). The brake linings 16, 18 pressing against the brake disk 14 are supported via the thrust piece 32.

If the parking brake state is to be released, the electromechanical actuating device 34 is then triggered again. According to the invention for reasons of a simple design no hydraulic assistance occurs. As the activation of the parking brake function and the application forces then arising were summoned up solely by means of the electromechanical actuating device 34, the performance capability of said device is then also sufficient to release the parking brake state. There is therefore no need for the actuating device 34 to be of such a powerful and stable design that for the purpose of releasing the parking brake state it summons up release forces that correspond to the collective load of hydraulically summoned-up application force and electromechanically summoned-up application force.

Figure 4:
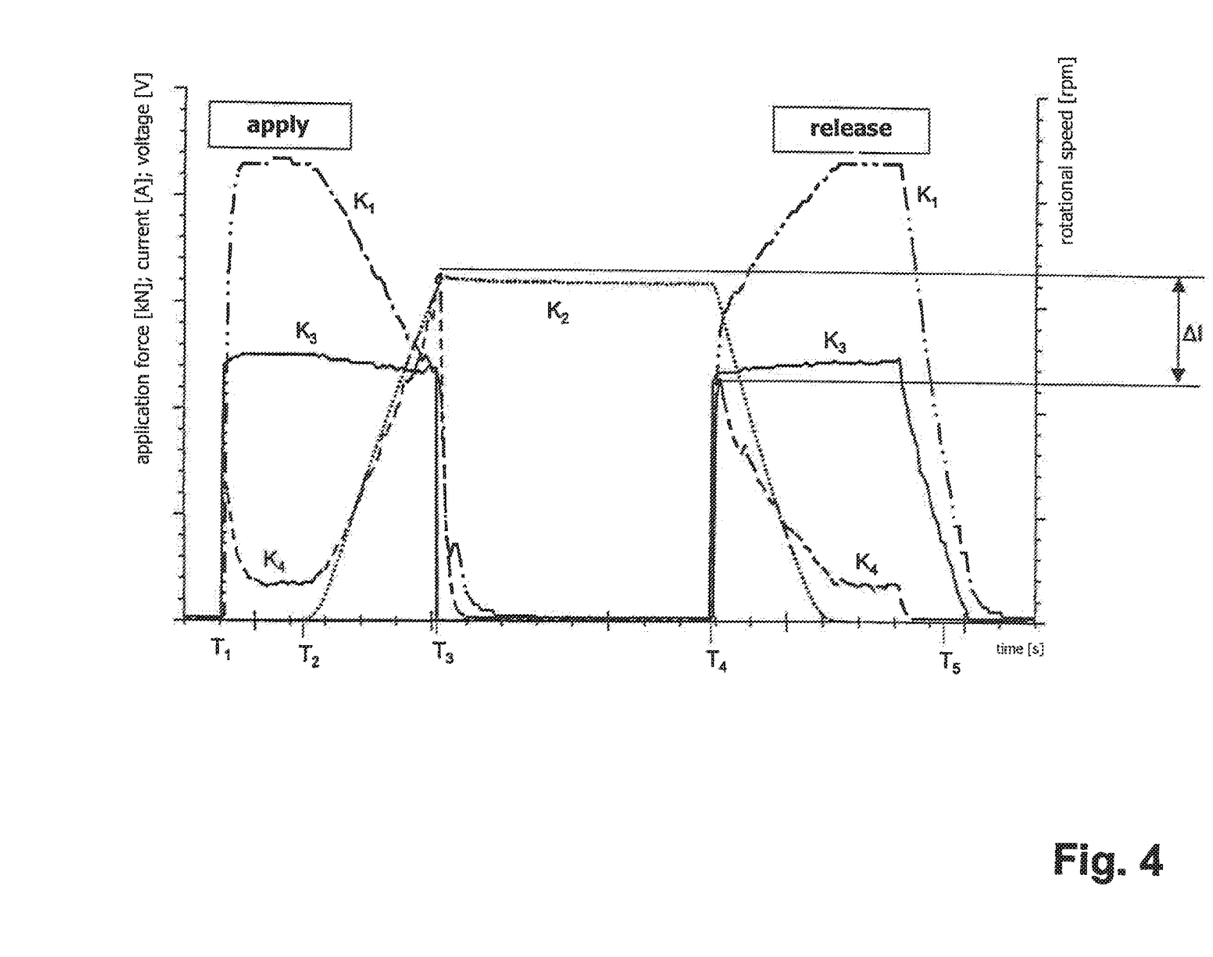
FIG. 4 is a diagram to explain the mode of operation of the invention.

The advantages of the invention are explained with reference to the diagram according to FIG. 4. Featuring in this diagram are various curves that show for the activating (applying) and deactivating (releasing) of the parking brake:

the characteristic of the rotational speed of the electromechanical actuating device 34 in dash-dot-dot line $K_1$;

the characteristic of the application force of the disk brake device 10 in dotted line $K_2$;

the characteristic of the voltage across the electromechanical actuating device 34 in continuous line $K_3$; and the characteristic of the current intensity electromechanical of the actuating device 34 in continuous line $K_4$.

To apply the parking brake, at the time $T_1$ a voltage U ($K_3$) is applied to the electric motor of the electromechanical actuating device 34. Initially the thrust piece 32 because of the prevailing hydraulic pressure may be moved substantially free of resistance until it comes into abutment with the actuating piston 92. At this time the current intensity ($K_4$) rises strongly, and from the time $T_2$ there occurs a further application of the disk brake device 10. At the time $T_3$ the desired application force ($K_2$) is reached. The voltage supply ($K_3$) is interrupted and the parking brake is applied.

If the parking brake is to be released, then at the time $T_4$ a voltage ($K_3$) is again applied across the electromechanical actuating device 34. The current intensity ($K_4$) immediately rises strongly because of the high resistance of the self-locking of the electromechanical actuating device 34, but after overcoming of the blocked state rapidly decreases. At the time $T_5$ the parking brake is fully released and the voltage supply ($K_3$) is disconnected again.

Owing to the fact that no constant hydraulic pressure was applied up to the end (time $T_3$) of the brake application operation, the maximum amount of the current intensity arising in the electromechanical actuating device 34 during release of the parking brake is smaller by the value $\Delta I$ than the maximum amount of the current intensity during the brake application. This means that as a whole the electromechanical actuating device 34 need be of a less powerful rating than would be the case if the activation of the parking brake were to be effected with permanent utilization of the collective load of hydraulic and electromechanical application force.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle brake system with a hydraulically controllable disk brake device, which has an actuating piston confining an inner space and an electromechanical actuating device with a thrust piece for activating a parking brake function, wherein the vehicle brake system has a hydraulic circuit having a hydraulic pressure source and controllable hydraulic functional elements in order to hydraulically control the disk brake device for a service brake action, including according to a driver service brake activation or according to an automatic activation, wherein the vehicle brake system further comprises a control device in order to control the electromechanical actuating device for actuating the parking brake function initiated by the driver or by an automatic activation of the parking brake function, wherein the control device is designed to control at least one of the hydraulic functional elements in such a way that, before the parking brake function is activated by controlling the electromechanical actuating device, a hydraulic volume, which is currently acting on the disk brake device in order to produce a hydraulic pressure that causes the service brake action, is hydraulically isolated, wherein a volume of the inner space receiving the hydraulic volume increases by moving the actuating piston by means of the thrust piece which further acts on the disk brake device upon activating the parking brake function, wherein, corresponding to the increase of the volume of the inner space, the hydraulic pressure is reduced when the volume of the inner space increases as a function of the thrust piece further acting on the disk brake device upon activating the parking brake function, such that a hydraulic force from the hydraulic pressure and an electromechanical force from the electromechanical actuating device each provide a respective load on the disc brake device, and wherein if there is no hydraulic pressure being applied to the disk brake device, then in order to activate the parking brake function only the electromechanical actuating device is triggered.

2. The vehicle brake system according to claim 1, wherein the hydraulically controllable disk brake device comprises a plurality of individual disk brake devices and the controllable hydraulic functional elements comprise a plurality of controllable valves in order selectively to supply hydraulic pressure to, or hydraulically isolate, the plurality of individual disk brake devices of the vehicle brake system.

3. The vehicle brake system according to claim 2, wherein the controllable valves are controllable by means of the control device in such a way that only the disk brake devices of the vehicle brake system that are designed with a mechanical actuating device can be hydraulically isolated.

4. The vehicle brake system according to claim 1, wherein the control device is configured with a slip regulating function.

5. The vehicle brake system according to claim 1, wherein the hydraulically controllable disk brake device comprises a plurality of individual disk brake devices and the controllable hydraulic functional elements comprise a plurality of controllable valves in order selectively to supply hydraulic pressure to, or hydraulically isolate, the plurality of individual disk brake devices of the vehicle brake system and that the control device is configured with a slip regulating function, wherein the hydraulic volume can be isolated by means of at least one valve associated with the slip regulating function.

6. The vehicle brake system according to claim 1, wherein the control device prior to the activation of the parking brake function detects whether as a result of the service brake action a hydraulic pressure is applied to the disk brake device.

7. The vehicle brake system according to claim 6, wherein the control device detects the presence of the service brake action on the basis of available parameters.

8. A method of controlling a vehicle brake system to activate the parking brake function according to claim 1, comprising the following steps:
detecting an actual state of a disk brake device,
isolating a hydraulic volume exerting a hydraulic pressure in the disk brake device, and
activating the electromechanical actuating device to apply the parking brake function.

9. The method according to claim 8 wherein the actual state is detected on the basis of available parameters.

10. The method of claim 9, wherein the parameters are a current switching state of a brake light switch, hydraulic pressure in a master cylinder, or pedal travel of a brake pedal.

11. The vehicle brake system according to claim 7, wherein the available parameters include a current switching state of a brake light switch, hydraulic pressure in a master cylinder, or pedal travel of a brake pedal.

12. A method of controlling a vehicle brake system, comprising the following steps:
providing a hydraulically controllable disk brake device, which has an actuating piston confining an inner space and an electromechanical actuating device with a thrust piece for activating a parking brake function, wherein the vehicle brake system has a hydraulic circuit having a hydraulic pressure source and controllable hydraulic functional elements in order to hydraulically control the disk brake device for a service brake action, including according to a driver service brake actuation or according to an automatic activation, wherein the vehicle brake system further comprises a control device in order to control the electromechanical actuating device according to a parking brake function initiated by the driver or by an automatic activation of the parking brake function, wherein the control device is designed to control at least one of the hydraulic functional elements in such a way that, before the parking brake function is activated by controlling the electromechanical actuating device, a hydraulic volume, which is currently acting on the disk brake device in order to produce a hydraulic pressure that causes the service brake action, is hydraulically isolated, wherein a volume of the inner space receiving the hydraulic volume increases by moving the actuating piston by means of the thrust piece which further acts on the disk brake device upon activating the parking brake function, and wherein the hydraulic pressure is reduced when the volume of the inner space increases as a function of the thrust piece further acting on the disk brake device upon activating the parking brake function, detecting an actual state of a disk brake device, isolating a hydraulic volume exerting a hydraulic pressure in the disk brake device, and activating the electromechanical actuating device to apply the parking brake function, such that a hydraulic force from the hydraulic pressure and a electromechanical force from the electromechanical actuating device each provide a respective load on the disk brake device, and wherein if there is no hydraulic pressure being applied to the disk brake device, then in order to activate the parking brake function only the electromechanical actuating device is triggered.

13. The vehicle brake system according to claim 1, wherein the electromechanical actuating device reaches a first maximum current intensity when a voltage supply to the electromechanical actuating device is reached; and wherein, when the parking brake is released, the electromechanical actuating device reaches a second maximum current intensity that is less than the first maximum current intensity.

14. The method of controlling the vehicle brake system according to claim 12, wherein the electromechanical actuating device reaches a first maximum current intensity when a voltage supply to the electromechanical actuating device is reached; and wherein, when the parking brake is released, the electromechanical actuating device reaches a second maximum current intensity that is less than the first maximum current intensity.

* * * * *